(12) United States Patent
Desmet et al.

(10) Patent No.: US 11,464,170 B2
(45) Date of Patent: Oct. 11, 2022

(54) OVER-CENTER LOCKING SYSTEM FOR A CHAFF PAN OF AN AGRICULTURAL HARVESTER

(71) Applicant: CNH Industrial America LLC, New Holland, PA (US)

(72) Inventors: Stefaan Desmet, Vosselare (BE); Frank R. G. Duquesne, Zwevegem (BE); Tim Passchyn, Sint-Michiels (BE)

(73) Assignee: CNH Industrial America LLC, New Holland, PA (US)

( * ) Notice: Subject to any disclaimer, the term of this patent is extended or adjusted under 35 U.S.C. 154(b) by 424 days.

(21) Appl. No.: 16/610,904

(22) PCT Filed: May 3, 2018

(86) PCT No.: PCT/EP2018/061421
§ 371 (c)(1),
(2) Date: Nov. 4, 2019

(87) PCT Pub. No.: WO2018/202811
PCT Pub. Date: Nov. 8, 2018

(65) Prior Publication Data
US 2020/0154642 A1    May 21, 2020

(30) Foreign Application Priority Data
May 4, 2017    (BE) .................. 2017/5314

(51) Int. Cl.
*A01F 12/44*    (2006.01)
*A01F 12/30*    (2006.01)
*A01D 41/00*    (2006.01)

(52) U.S. Cl.
CPC ............ *A01F 12/446* (2013.01); *A01D 41/00* (2013.01); *A01F 12/30* (2013.01); *A01F 12/44* (2013.01)

(58) Field of Classification Search
CPC ...... A01F 12/446; A01F 12/44; A01F 12/444; A01F 12/30; A01D 41/1243; A01D 41/00
See application file for complete search history.

(56) References Cited

U.S. PATENT DOCUMENTS 2,626,159 A * 1/1953 Ernests .................. A01F 12/40
460/109
2,831,577 A * 4/1958 Farber .................. A01D 75/282
209/416

(Continued)

FOREIGN PATENT DOCUMENTS

DE      3618105 A1    12/1987
EP      0657095 B1 *   8/1998 ............. A01F 12/40

(Continued)

OTHER PUBLICATIONS

International Search Report and Written Opinion for Application No. PCT/EP2018/061421 dated Aug. 1, 2018 (12 pages).

*Primary Examiner* — Arpad Fabian-Kovacs
(74) *Attorney, Agent, or Firm* — Peter Zacharias; Patrick Sheldrake (57) ABSTRACT

A grain cleaning system in an agricultural harvester, that includes a chaff pan with a pivotal axis near an end of the chaff pan. The chaff pan has a dual locking system coupled thereto for holding the chaff pan in two different positions. The dual locking system has a first over-center locking arrangement and a second over-center locking arrangement. The first locking arrangement is used to hold the chaff pan in an upward position when the first locking arrangement is locked. The first locking arrangement includes a first linkage element; and a second linkage element. The second locking arrangement holds the chaff pan in a locked downward position when the second locking arrangement is locked. The second locking arrangement includes a first linkage element; and a second linkage element. The first linkage (Continued)

element of the first locking arrangement is also the first linkage element of the second locking arrangement.

15 Claims, 12 Drawing Sheets

(56) References Cited

U.S. PATENT DOCUMENTS

| | | | | |
|---|---|---|---|---|
| 4,484,588 | A * | 11/1984 | Huhman | A01F 12/28 |
| | | | | 460/109 |
| 6,554,701 | B1 | 4/2003 | Wolters | |
| 6,582,298 | B2 | 6/2003 | Wolters | |
| 7,862,413 | B2 * | 1/2011 | Isaac | A01F 12/40 |
| | | | | 460/112 |
| 8,133,101 | B2 * | 3/2012 | Regier | A01F 12/181 |
| | | | | 460/109 |
| 8,152,609 | B2 | 4/2012 | Benes et al. | |
| 8,834,243 | B2 * | 9/2014 | Benes | A01D 41/1243 |
| | | | | 460/97 |
| 2003/0100353 | A1 | 5/2003 | Wolters | |
| 2012/0172097 | A1 | 7/2012 | Benes et al. | |
| 2016/0029562 | A1 * | 2/2016 | De Smet | A01F 12/32 |
| | | | | 460/1 |
| 2017/0164560 | A1 * | 6/2017 | Van Hullebusch | A01F 12/28 |
| 2019/0183053 | A1 * | 6/2019 | Narayanan | A01F 12/305 |

FOREIGN PATENT DOCUMENTS

| | | | | | |
|---|---|---|---|---|---|
| EP | | 1316249 | A1 | 1/2007 | |
| GB | | 2487193 | A * | 7/2012 | A01F 12/30 |
| GB | | 2487196 | A * | 7/2012 | A01F 12/30 |
| WO | WO-2013148647 | A1 * | 10/2013 | A01D 41/1243 |

* cited by examiner

//OVER-CENTER LOCKING SYSTEM FOR A CHAFF PAN OF AN AGRICULTURAL HARVESTER

BACKGROUND OF THE INVENTION

The present invention relates to agricultural harvesters, and, more specifically to pivoting chaff pan systems used with such harvesters.

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve or chaff pan assembly) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve or chaff pan are discharged at the rear of the combine. Grain falling through the lower sieve lands on a bottom pan of the cleaning system, where it is conveyed in a forward direction toward a clean grain auger.

The clean grain auger conveys the grain to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

Agricultural combines are expensive and have to be adaptable to harvest various grains under varying crop conditions in order to provide robust operation. This includes the need to adjust and redefine the operational characteristics of the threshing and cleaning systems, such as the positioning or orientation of the chaff pan.

What is needed in the art is a robust and economical pivoting chaff pan locking system.

SUMMARY OF THE INVENTION

The present invention provides a pivoting chaff pan for use in agricultural harvesters.

The invention in one form is directed to a grain cleaning system for receiving grain and residual crop material from a threshing system in an agricultural harvester, the grain cleaning system includes a set of sieves for further separation of the grain from the residual crop material that comes from the threshing system. The set of sieves include a chaff pan with a pivotal axis near an end of the chaff pan. The chaff pan has a chaff pan dual locking system coupled to the chaff pan for the holding of the chaff pan in two different positions when the chaff pan is pivoted about the pivotal axis. The chaff pan dual locking system has a first over-center locking arrangement and a second over-center locking arrangement. The first over-center locking arrangement is used to hold the chaff pan in an upward engaged position when the first over-center locking arrangement is locked. The first over-center locking arrangement includes a first linkage element and a second linkage element. The first linkage element is pivotally coupled to the chaff pan, and the second linkage element is pivotally coupled to the first linkage element. There is also a third linkage element that is non-pivotally constrained about the pivotal axis, with the second linkage element being pivotally coupled to the third linkage element. The second over-center locking arrangement holds the chaff pan in a locked downward disengaged position when the second over-center locking arrangement is locked. The second over-center locking arrangement includes a first linkage element; and a second linkage element. The first linkage element of the first over-center locking arrangement is also the first linkage element of the second over-center locking arrangement.

In another embodiment of the invention there is a first handle coupled to both the first over-center locking arrangement and the second over-center locking arrangement. There is also a second handle coupled to the chaff pan. The first handle engages and disengages the first over-center locking arrangement, and engages and disengages the second over-center locking arrangement. The second handle is utilized to pivot the chaff pan between the first over-center locking arrangement and the second over-center locking arrangement.

In a further embodiment of the invention the second handle is rigidly coupled to the chaff pan.

In yet another embodiment the chaff pan dual locking system includes a handle that is rigidly coupled with the first linkage element.

In still yet another embodiment the handle engages and disengages both the first over-center locking arrangement and the second over-center locking arrangement.

In still yet another embodiment the handle is not rigidly coupled to the chaff pan.

In still yet another embodiment the first over-center locking arrangement and the second over-center locking arrangement move proximate to a common plane.

In still yet another embodiment the handle also operates proximate to the common plane.

In still yet another embodiment the handle is offset from and is not proximate to the common plane, the handle moving in another plane parallel with the common plane.

In still yet another embodiment the chaff pan dual locking system is the first chaff pan dual locking system and is positioned to one side of a longitudinal center of the chaff pan.

In still yet another embodiment the grain cleaning system further includes a second chaff pan dual locking system substantially similar to the first chaff pan dual locking system, the second chaff pan dual locking system being positioned on another side of the longitudinal center of the chaff pan.

In still yet another embodiment the grain cleaning system further includes a handle that is rigidly coupled with the first linkage element of both the first chaff pan dual locking system and the second chaff pan dual locking system.

In still yet another embodiment the grain cleaning system further includes at least one other handle rigidly coupled to the chaff pan.

In still yet another embodiment the handle engages and disengages both the first over-center locking arrangement and the second over-center locking arrangement of both the first chaff pan dual locking system and the second chaff pan dual locking system.

An advantage of the present invention is that the linkage elements are constrained so that when the chaff pan is locked in either position the linkage elements are constrained so that they do not rattle.

Another advantage is that there is at least one shared linkage between the two locking arrangements.

Yet another advantage is that a single handle can lock and unlock both of the two locking arrangements.

A further advantage is that the handle can operate in a plane separate from the operating plane of the dual locking arrangements.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-aft direction of the agricultural harvester and are equally not to be construed as limiting.

Figure 1:
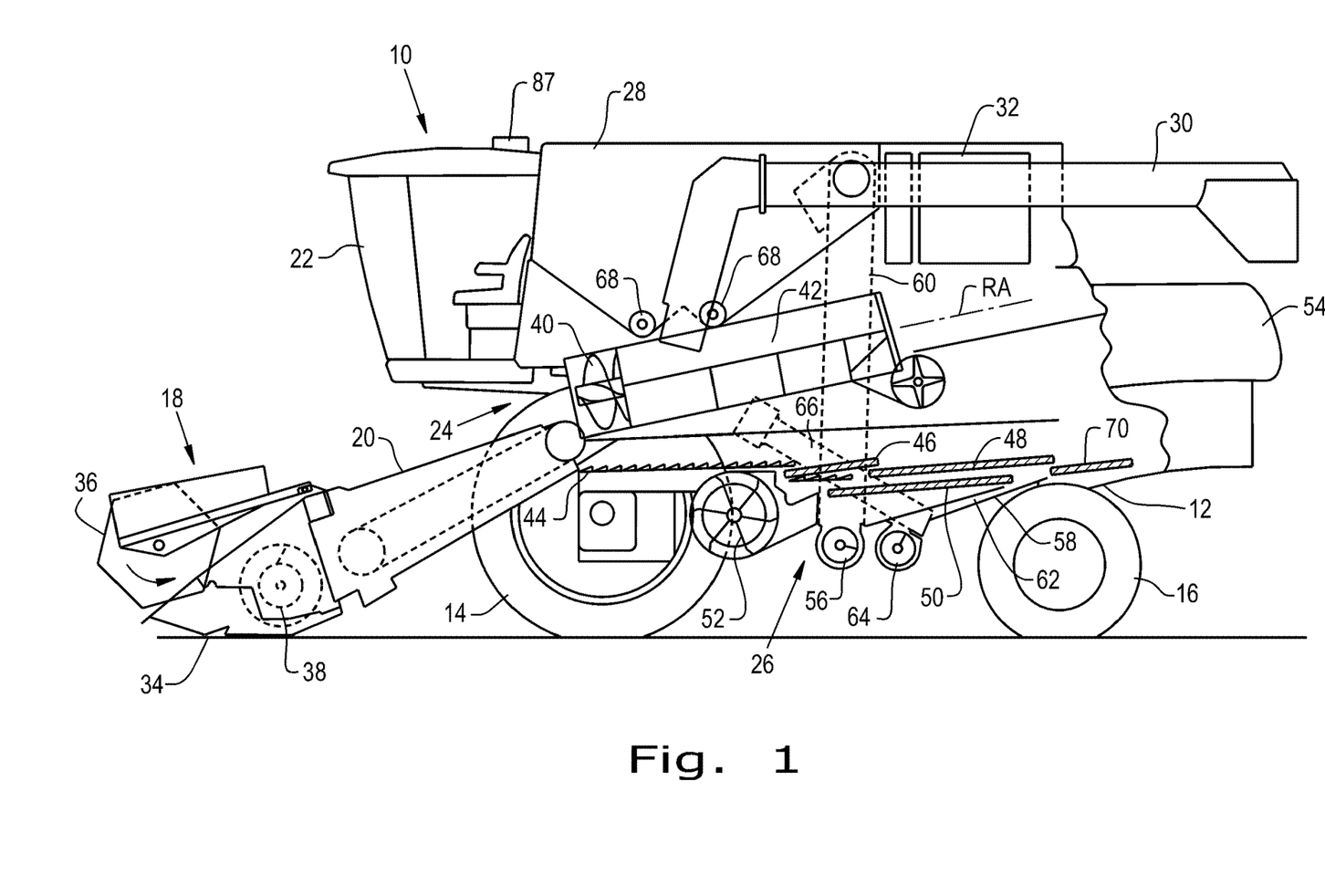
FIG. 1 is a side view of an embodiment of an agricultural harvester in the form of a combine, which includes an embodiment of a chaff pan dual locking system of the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a grain cleaning system 26, a grain tank 28, and an unloading conveyance 30. Unloading conveyor 30 is illustrated as an unloading auger, but can also be configured as a belt conveyor, chain elevator, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable about an axis RA within a corresponding perforated concave system 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward grain cleaning system 26. Cleaning system 26 may include a pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. From at least sieve 48 material flows onto chaff pan 70. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 62 of cleaning system 26. Clean grain auger 56 conveys the clean grain laterally to a generally vertically arranged grain elevator 60 for transport to grain tank 28. Tailings from cleaning system 26 fall to a tailings auger trough 58. The tailings are transported via tailings auger 64 and return auger 66 to the upstream end of cleaning system 26 for repeated cleaning action. Cross augers 68 at the bottom of grain tank 28 convey the clean grain within grain tank 28 to unloading auger 30 for discharge from combine 10.

Figure 2:
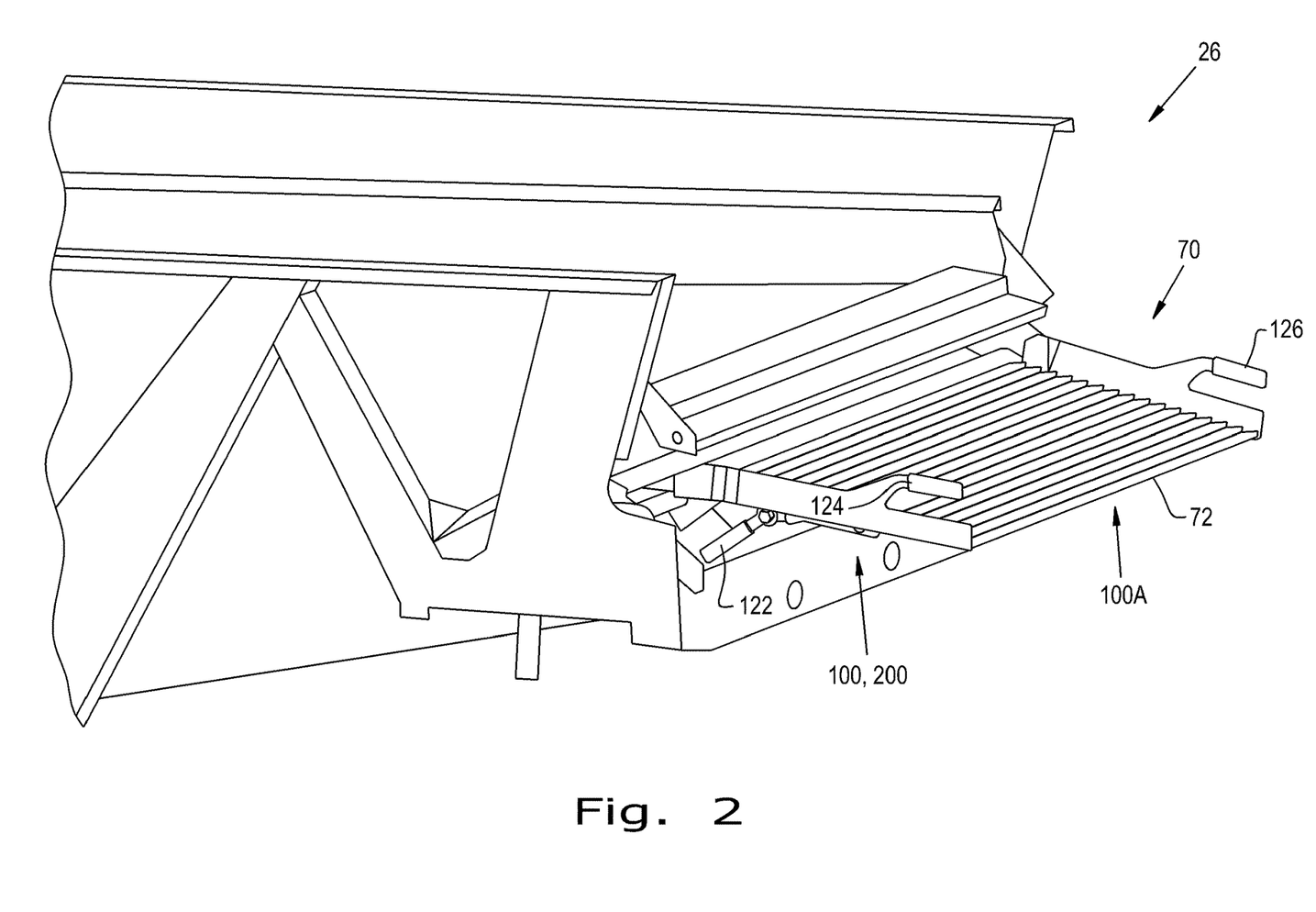
FIG. 2 is a perspective view of one embodiment of the chaff pan locking system used in the harvester of FIG. 1.

According to an aspect of the present invention, the grain cleaning system 26 that receives grain and residual crop material from the threshing system 24 of combine 10 includes the chaff pan 70 as illustrated in FIG. 2 having a chaff pan dual locking system 100. The term dual locking refers to the inventive interaction of two locking mechanisms that serve to lock chaff pan 70 in one of two locked positions.

Figure 4:
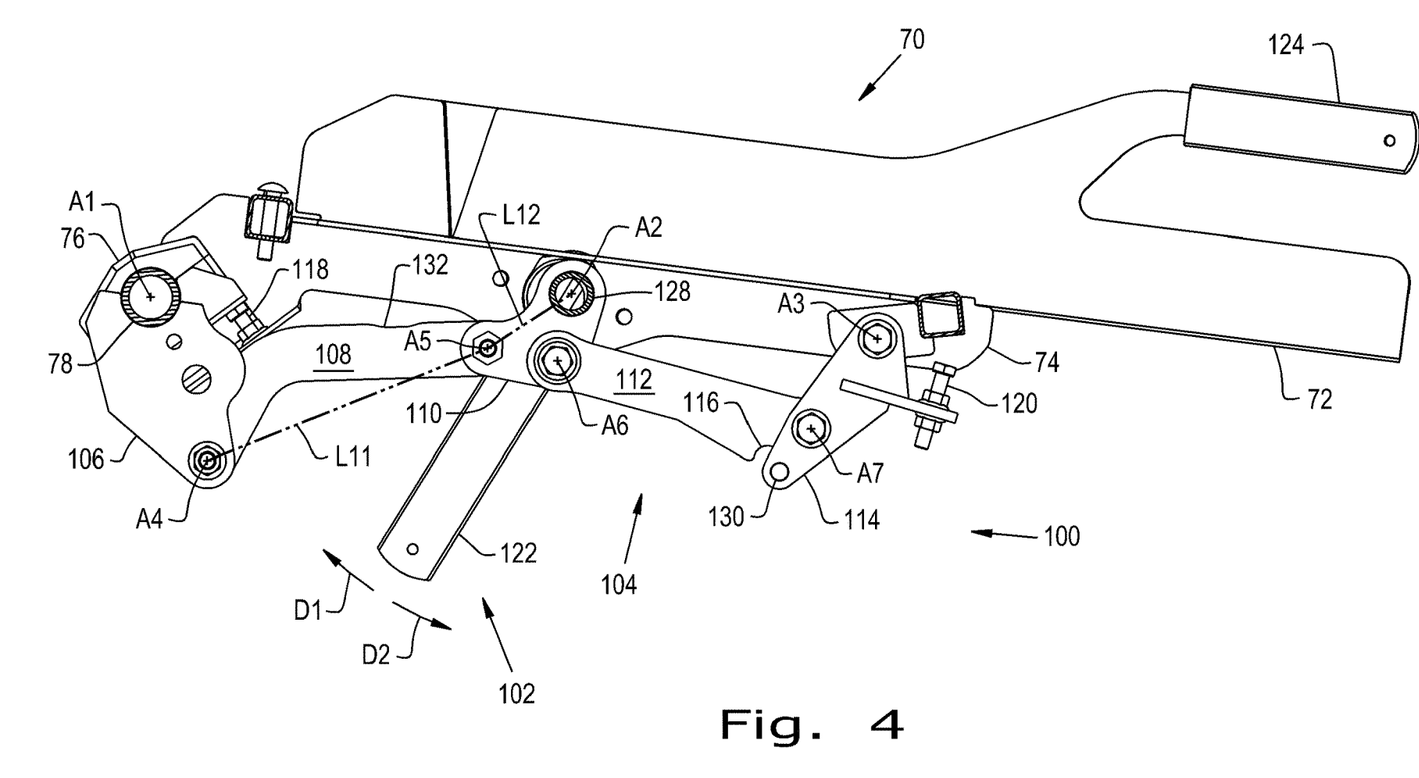
FIG. 4 is another side view of the chaff pan dual locking system shown in FIGS. 2 and 3, with the chaff pan dual locking system being in an intermediate, disengaged and unlocked position, illustrating the first locking arrangement in an unlocked state.
Figure 5:
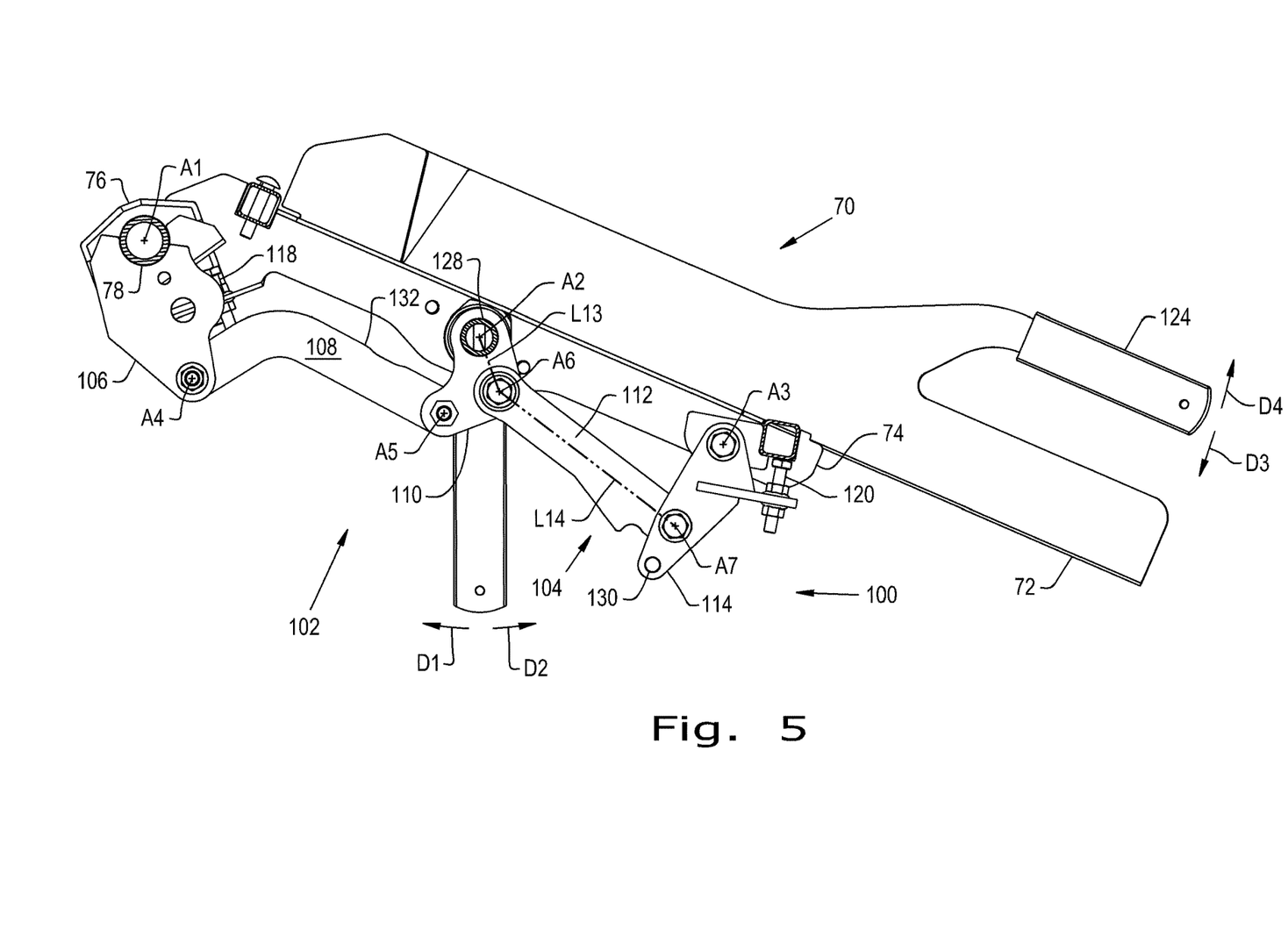
FIG. 5 is yet another side view of the chaff pan dual locking system shown in FIGS. 2-4, with the chaff pan dual locking system being in an intermediate, disengaged and unlocked position, illustrating the second locking arrangement in an unlocked state.
Figure 6:
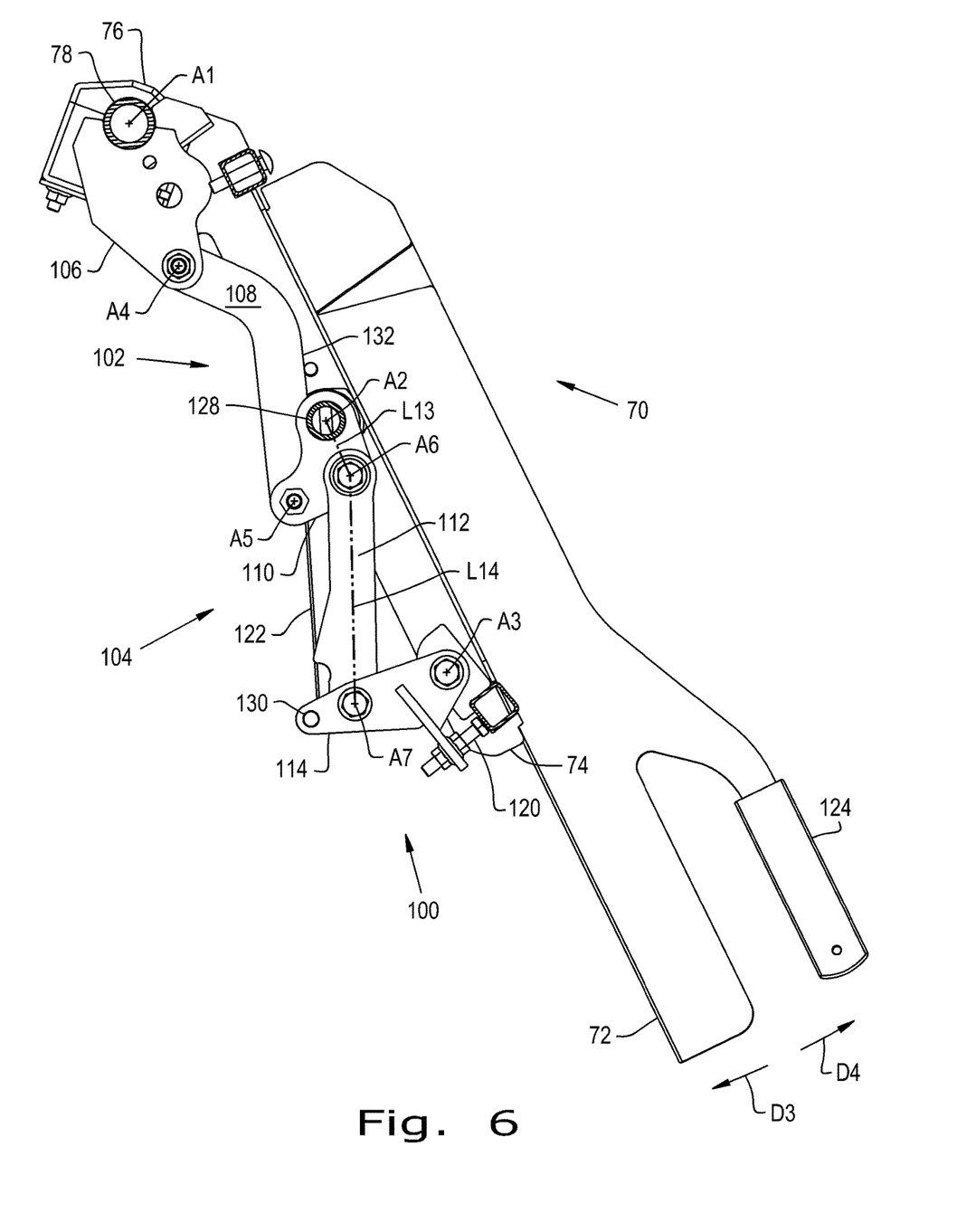
FIG. 6 is still yet another side view of the chaff pan dual locking system shown in FIGS. 2-5, with the chaff pan dual locking system being in a downward, disengaged and locked position, illustrating the second locking arrangement in a locked state.

Now, additionally referring to FIGS. 3-6 there is shown further features and details of the chaff pan dual locking system 100. The chaff pan dual locking system 100 includes a first over-center locking arrangement 102 and a second over-center locking arrangement 104. The over-center locking arrangements 102 and 104 can be considered the linkages and pivots that respectively serve to place legs L11 and L12; and legs L13 and L14, which are abstractly shown for illustrative purposes, in locked or unlocked conditions. FIGS. 3-6, can be viewed in sequence as representing the chaff pan 70 being moved from a locked upward position (FIG. 3), to transitioning positions (FIGS. 4 and 5) to a locked lowered position (FIG. 6).

Further, the chaff pan dual locking system 100 includes linkage elements 106, 108, 110, 112 and 114, a stop 116, adjustable stops 118 and 120, handles 122, 124, and 126, a tube 128, a pin 130, and a stopping surface 132. The linkage element 110 is considered a first linkage element 110, and the linkage element 108 is considered a second linkage element 108 of the first over-center locking arrangement 102. The first linkage element 110 of the first over-center locking arrangement 102 is also the first linkage element 110 of the second over-center locking arrangement 104, with the linkage element 112, being the second linkage element 112 of the second over-center locking arrangement 104.

The chaff pan 70 includes a formed pan 72 coupled to support members 74 that are coupled to bearing members 76 that are pivotally coupled to a tube 78. The chaff pan 70 is pivotal about an axis A1, which is the center of the tube 78. The tube 78 is rigidly coupled to the grain cleaning system 26. The chaff pan dual locking system 100 serves to use linkage elements 108, 110, 112 and 114, by moving them to over-center locking positions to hold chaff pan 70 in a locked upward position, as shown in FIG. 3 or in a locked downward disengaged position, as shown in FIG. 6.

Figure 11:
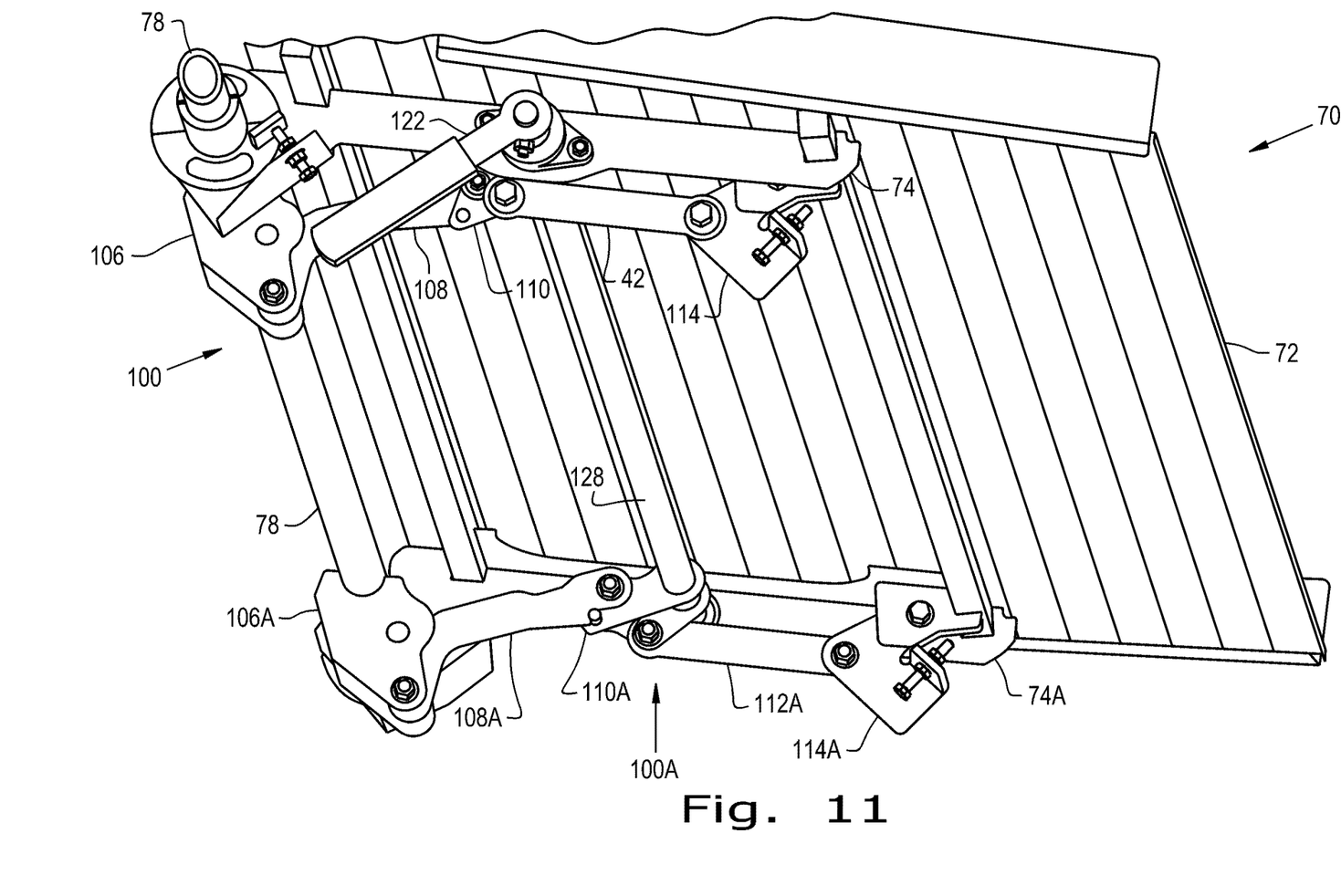
FIG. 11 is a perspective view looking up at the bottom of the chaff pan illustrating two chaff pan dual locking systems similar in configuration as in FIGS. 2-6.
Figure 12:
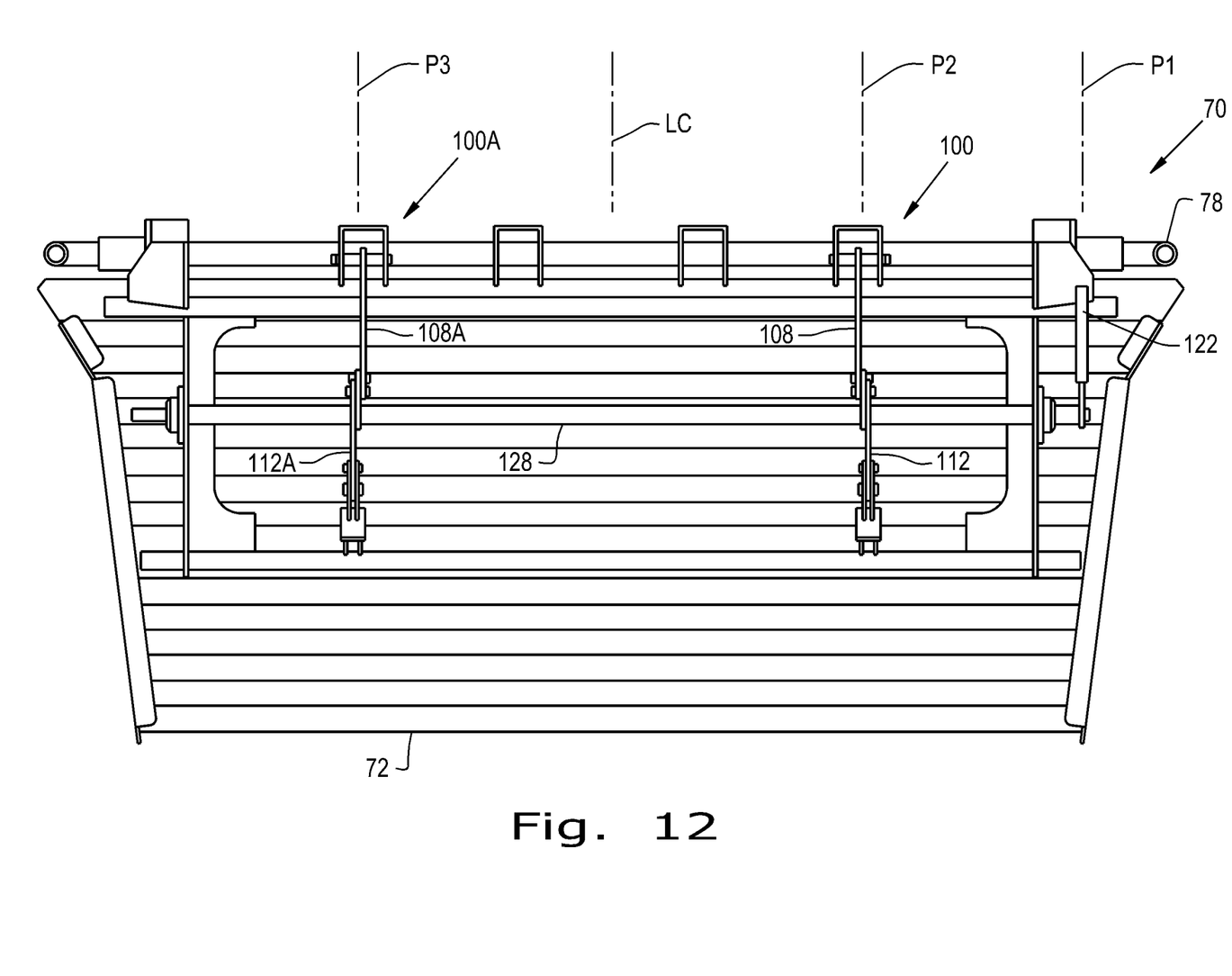
FIG. 12 is a bottom view of the chaff pan with the top of the view being oriented toward the front of the harvester illustrating the differing planes in which the two chaff pan dual locking systems can operate with a single handle.

The linkage element 106 is rigidly connected to the tube 78 and does not pivot relative to axis A1 so that the linkage element 106 is non-pivotally constrained about the axis A1, and the linkage element 106 is pivotally coupled to the linkage element 108 about an axis A4. The linkage element 108 is also pivotally coupled to the linkage element 110 about an axis A5. The linkage element 110 is pivotally coupled to the linkage element 112, and is rigidly coupled to the tube 128. The tube 128 is also rigidly coupled to the handle 122, but the tube 128 is pivotally coupled to the support member 74. This allows the tube 128 to manipulate more than one chaff pan dual locking system 100 using just one handle 122 (as illustrated in FIGS. 11 and 12).

Figure 3:
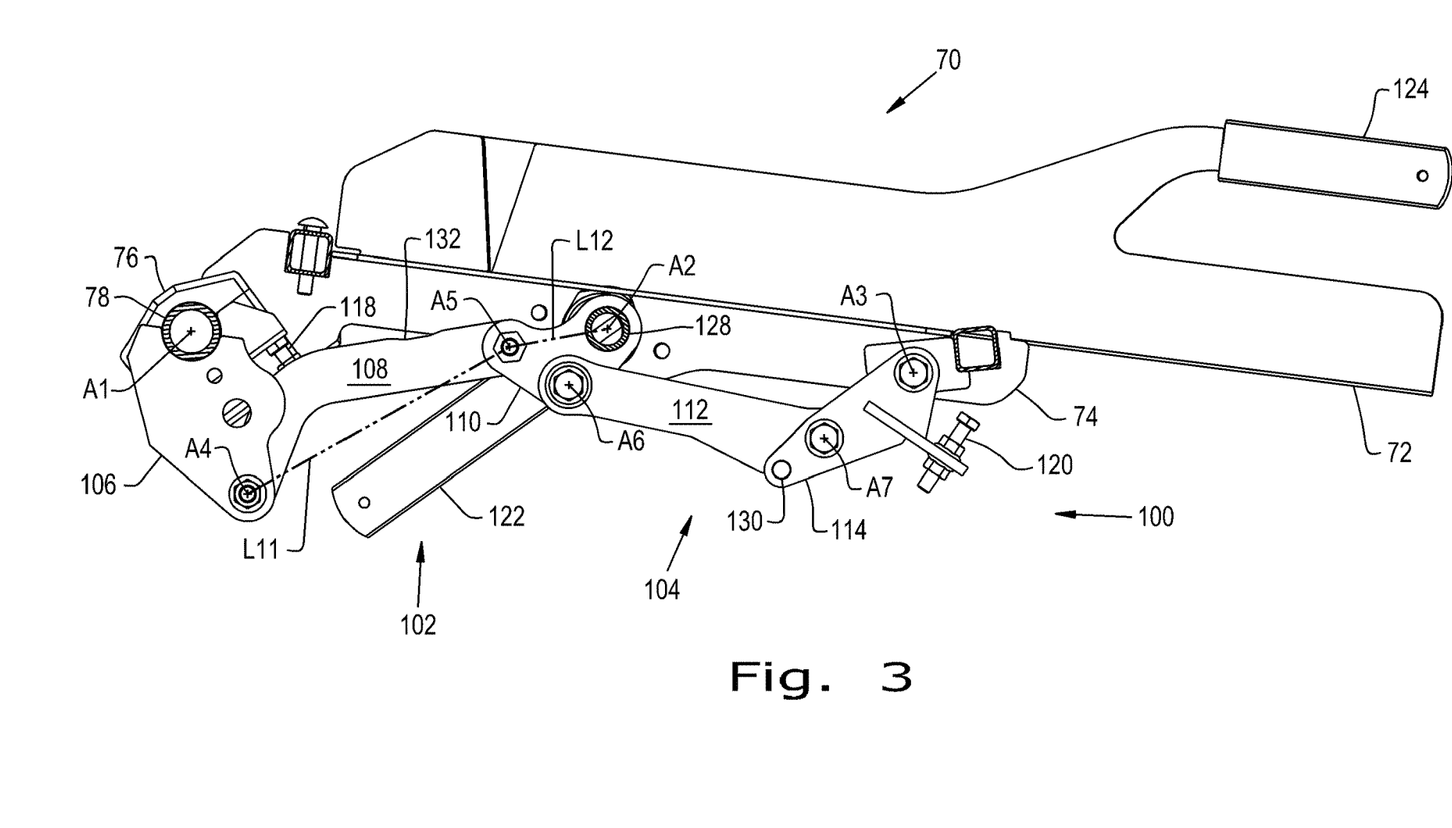
FIG. 3 is a side view of the chaff pan dual locking system shown in FIG. 2, with the chaff pan dual locking system being in an upward, engaged and locked position, illustrating a first locking arrangement.

A pin 130 protrudes from the linkage element 114 and contacts a stop surface 116 so that pivotal motion of the linkage element 112 relative to the linkage element 114 is stopped when the pin 130 contacts the stop surface 116 (also referred to as a notch 116), which is the condition as shown in FIG. 3. When the first over-center locking arrangement 102, is engaged, as shown in FIG. 3, an adjustable stop 118 is in contact with an opposing surface to limit the upward rotation of the chaff pan 70 and to hold the first over-center locking arrangement 102 in position. The handle 122 is positioned such that legs L11 and L12, which have a common pivot axis A5, are in an over-center position (illustrated in FIG. 3), to thereby hold the chaff pan 70 in an upright position.

To lower the chaff pan 70 the handle 122 is moved in a direction D2, as shown in FIG. 4, with legs L11 and L12 being shown in a non-over-center unlocked condition, to thereby allow the chaff pan 70 to pivot downward about the axis A1. The movement of the handle 122 in the direction D2, while moving the linkage elements 108 and 110, also moves the linkage elements 112 and 114. To further facilitate the movement of the chaff pan 70 in a direction D3, the handles 124 and 126 can be used to pivot the chaff pan 70 downward. The movement of the chaff pan 70 in direction D3 causes a continued movement of the linkage elements 112 and 114, respectively about axis A6 and A7, as the linkage element 110 is pivoting about the axis A2, and the linkage element 114 is pivoting about the axis A3. The linkage element 114 stops pivoting about the axis A3 when the adjustable stop 120 contacts a surface of the support member 74, as can be seen in FIGS. 5 and 6.

The legs L13 and L14 come into play as the chaff pan 70 continues to pivot in direction D3, with legs L13 and L14 of the locking arrangement 104 being shown in a non-over-center condition in FIG. 5 and in an over-center locked condition in FIG. 6. While moving in the direction D3 the stop surface 132 comes to rest against a surface of tube 128, which can be surmised from FIGS. 5 and 6. By keeping a tension on the linkage elements that are not being used in the over-center locking condition, then rattling of the components is advantageously avoided. It is contemplated that the over-center locking arrangement 104, as shown in FIG. 6, may be obtained by the movement of either or both the handle 122 and the handles 124 and 126.

To move the chaff pan 70 back to an engaged upper position, first handle 122 is moved in direction D1 to change locking arrangement 104 from the engaged over-center locked condition illustrated in FIG. 6, so that the locking arrangement 104 with legs L13 and L14 transition to a disengaged or unlocked condition illustrated in FIG. 5. Then the handles 124 are used to lift the chaff pan 70 upward in direction D4. When the chaff pan 70 is raised, similar to that illustrated in FIG. 4, then the handle 122 is moved in direction D1 to place the first over-center locking arrangement 102 in an over-center locked arrangement 102 of legs L11 and L12, as shown in FIG. 3.

Now, additionally referring to FIGS. 7-10 there is shown a further embodiment of the invention that has a chaff pan dual locking system 200, with similar functioning items of the previous embodiment having 100 added to each reference number. The chaff pan dual locking system 200 includes a first locking arrangement 202 and a second locking arrangement 204. The over-center locking arrangements 202 and 204 can be considered the linkages and pivots that respectively serve to place legs L21 and L22; and legs L23 and L24, which are abstractly shown for illustrative purposes, in locked or unlocked conditions. Here support member 74 is used as a linkage 74 for locking arrangement 204.

Further, the chaff pan dual locking system 200 includes linkage elements 206, 208 and 210, stops 218 and 220, a handle 222, a tube 228 and a pin 230. The linkage element 210 is considered a first linkage element 210, and the linkage element 208 is considered a second linkage element 208 of the first over-center locking arrangement 202. The first linkage element 210 of the first over-center locking arrangement 202 is also the first linkage element 210 of the second over-center locking arrangement 204, with the linkage element 74, being the second linkage element 74 of the second over-center locking arrangement 204.

Figure 10:
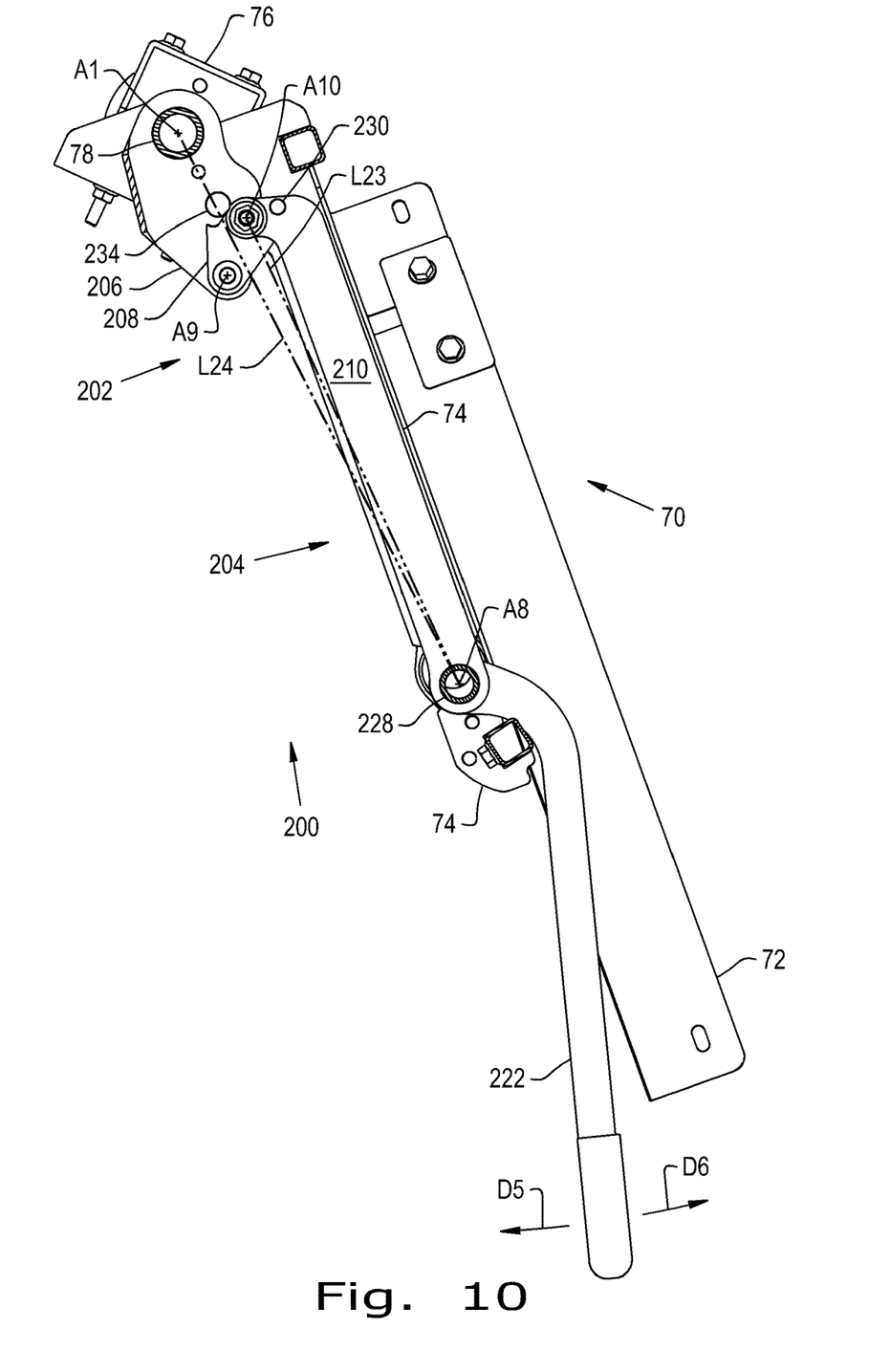
FIG. 10 is still yet another side view of the chaff pan dual locking system shown in FIGS. 7-9, with the chaff pan dual locking system being in a downward, disengaged and locked position, illustrating the second locking arrangement in a locked state.

As in the previous embodiment of the invention, the chaff pan 70 includes a formed pan 72 coupled to the support members 74 that are coupled to the bearing members 76 that are pivotally coupled to the tube 78. The chaff pan 70 is pivotal about the axis A1, which is the center of the tube 78. The tube 78 is rigidly coupled to the grain cleaning system 26. The chaff pan dual locking system 200 serves to use the linkage elements 208, 210 and 74, by moving them to over-center locking positions to hold the chaff pan 70 in the locked upward position, as shown in FIG. 7, or in the locked downward disengaged position, as illustrated in FIG. 10.

The linkage element 206 is rigidly coupled to the tube 78 and does not pivot relative to axis A1 so that the linkage element 206 is non-pivotally constrained about the axis A1, and the linkage element 206 is pivotally coupled to the linkage element 208 about an axis A9. The linkage element 208 is also pivotally coupled to the linkage element 210 about an axis A10. The linkage element 210 is rigidly coupled to the tube 228. The tube 228 is also rigidly coupled to the handle 222, but the tube 228 is pivotally coupled to the support member 74. This allows the tube 228 to manipulate more than one chaff pan dual locking system 200 using just one handle 222.

Figure 7:
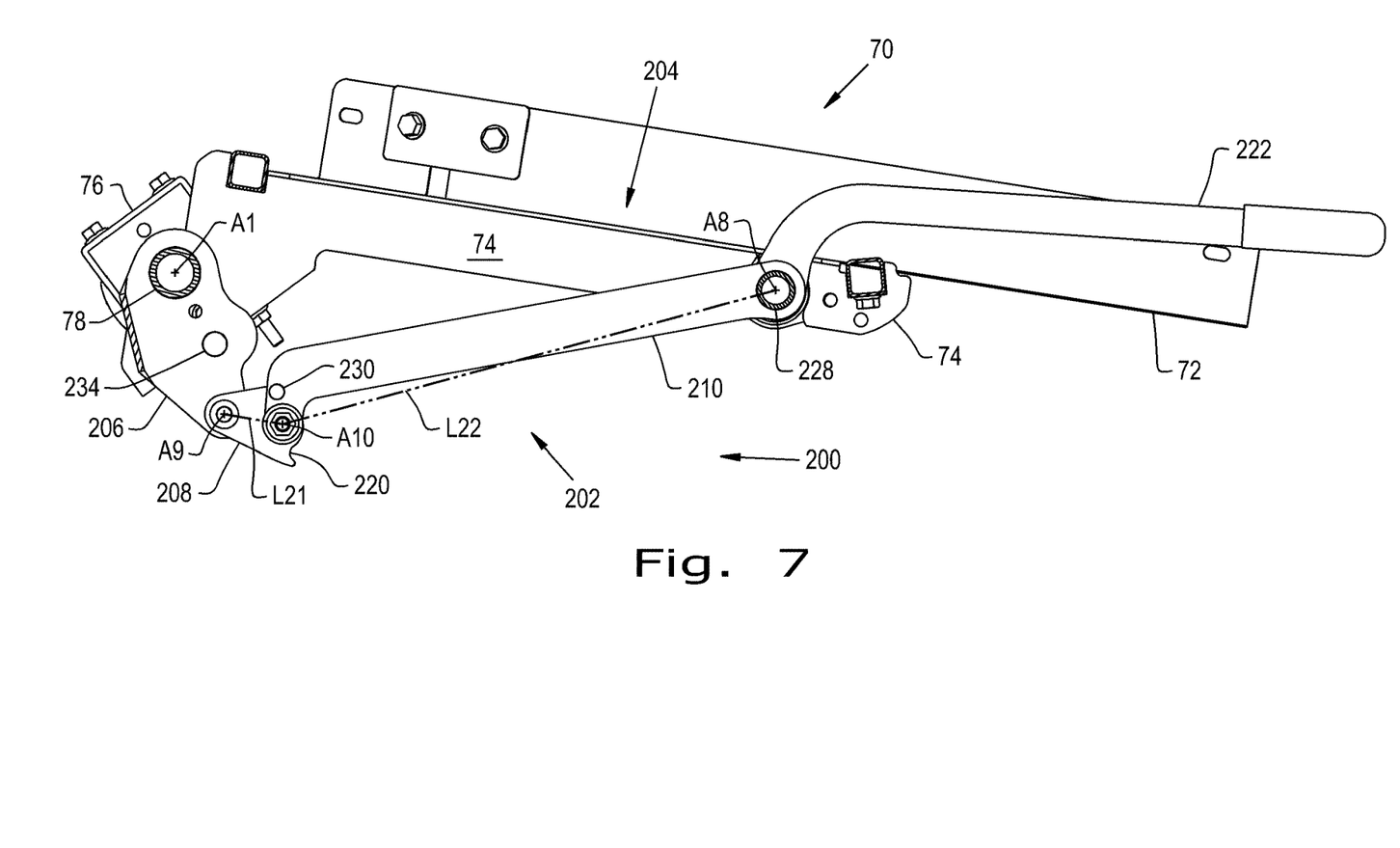
FIG. 7 is a side view of another embodiment of a chaff pan dual locking system used in the harvester of FIG. 1, with the chaff pan dual locking system being in an upward, engaged and locked position, illustrating a first locking arrangement.

A pin 230 protrudes from the linkage element 210 and contacts a stop surface 218 so that pivotal motion of the linkage element 210 relative to the linkage element 208 is stopped when the pin 230 contacts the stop surface 218, which is the condition as shown in FIG. 7. When the first over-center locking arrangement 202, is engaged, as shown in FIG. 7, the pin 230 is in contact with the surface 218 to hold the locking arrangement 202 in position. The handle 222 is positioned such that legs L21 and L22, which have a mutual pivot axis A10, are in an over-center position (illustrated in FIG. 7), to thereby hold the chaff pan 70 in an upright position.

Figure 8:
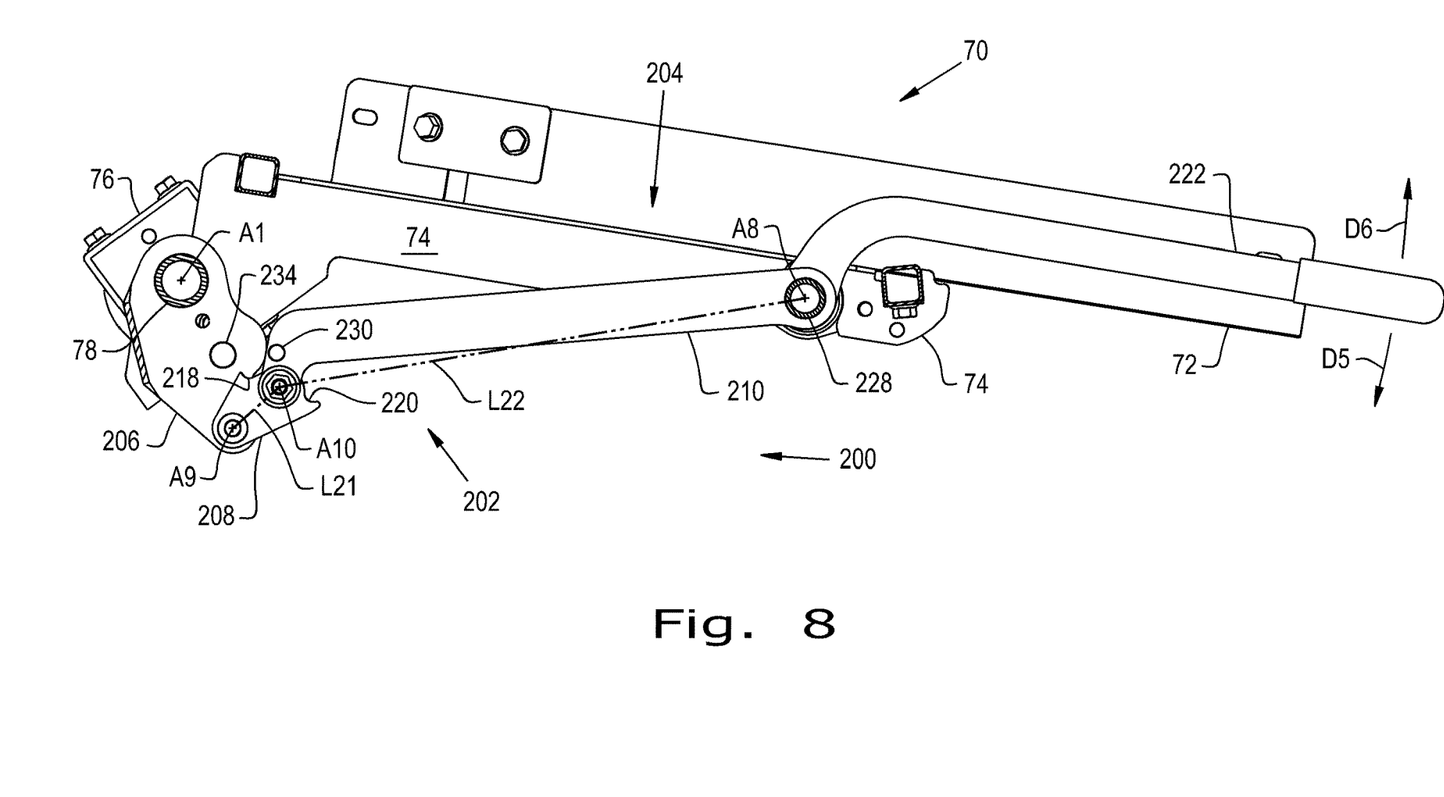
FIG. 8 is another side view of the chaff pan dual locking system shown in FIG. 7, with the chaff pan dual locking system being in an intermediate, disengaged and unlocked position, illustrating the first locking arrangement in an unlocked state.

To lower the chaff pan 70 the handle 222 is moved in a direction D5, as shown in FIG. 8, with legs L21 and L22 being shown in a non-over-center unlocked condition, to thereby allow the chaff pan 70 to pivot downward about the axis A1. The movement of the handle 222 in the direction D5, moves the linkage elements 208 and 210. The movement of the chaff pan 70 in direction D5 causes the linkage element 210 to pivoting about the axis A8.

Figure 9:
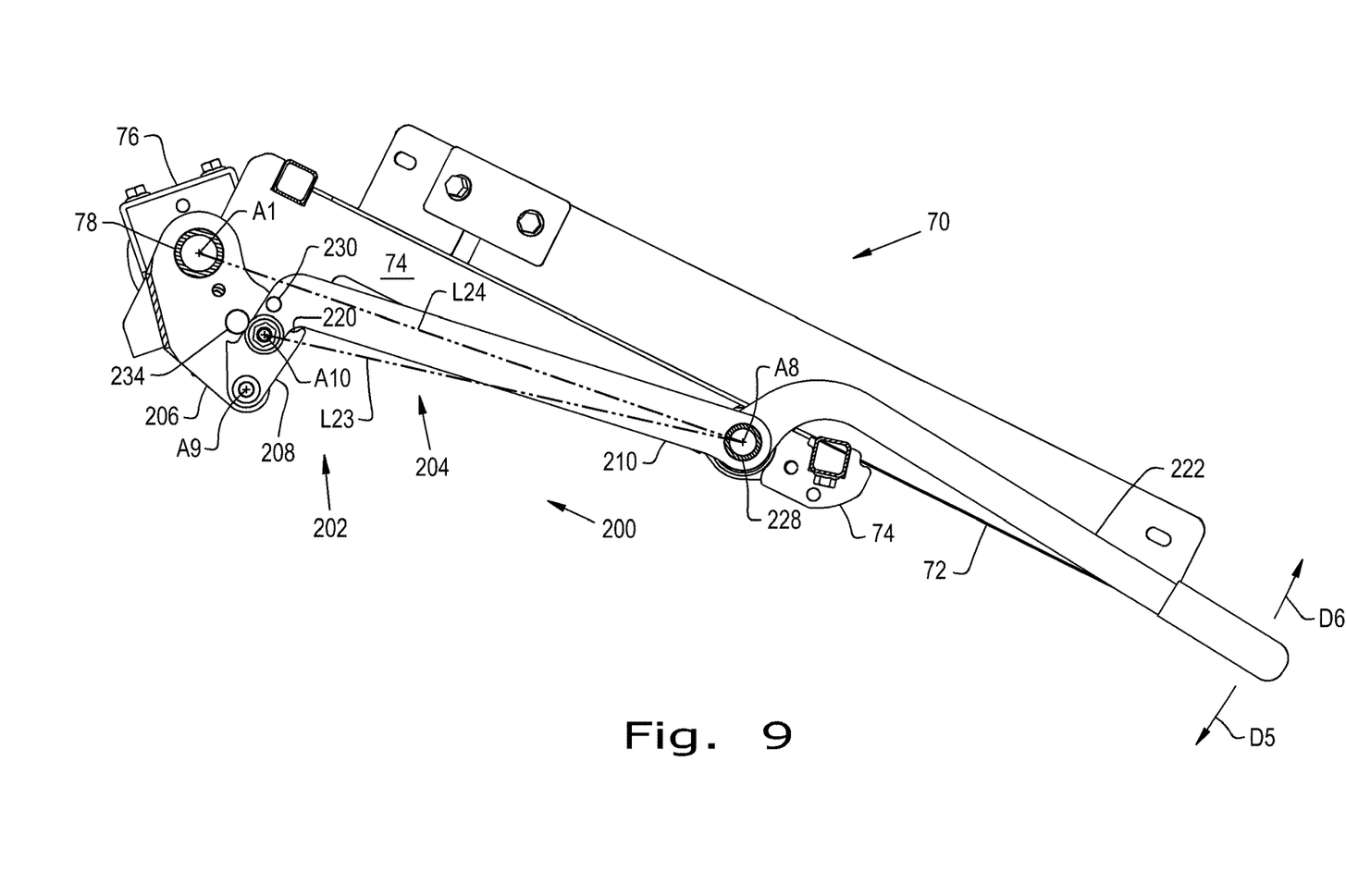
FIG. 9 is yet another side view of the chaff pan dual locking system shown in FIGS. 7 and 8, with the chaff pan dual locking system being in an intermediate, disengaged and unlocked position, illustrating the second locking arrangement in an unlocked state.

The legs L23 and L24 come into play (see FIG. 9) as the chaff pan 70 continues to pivot in direction D5, with legs L23 and L24 of the locking arrangement 202 being shown in a non-over-center unlocked condition in FIG. 9 and in an over-center locked condition in FIG. 10. While moving in the direction D5 the stop surface 220 comes to rest against the pin 230, which can be surmised from FIGS. 8-10.

To move the chaff pan 70 back to an engaged upper position, first handle 222 is moved in direction D6 to change locking arrangement 204 from the engaged over-center locked condition illustrated in FIG. 10, so that the locking arrangement 204 with legs L23 and L24 transition to a disengaged or unlocked condition illustrated in FIG. 9. The chaff pan 70 is then lifted upward in direction D6. When the chaff pan 70 is raised similar to that illustrated in FIG. 8, then the handle 222 is continued to be moved in direction D6 to place the locking arrangement 202 in an over-center locked arrangement 202 of legs L21 and L22, as illustrated in FIG. 7.

Now additionally referring to FIGS. 11 and 12, there are illustrated two chaff pan dual locking systems 100 and 100A, which can also represent two of the chaff pan dual locking systems 200. The "A" suffix is used to denote the parts that are identical to the reference number parts without the suffix, or they are a mirror image of the non-suffix parts. The chaff pan dual locking systems 100 and 100A operate in separate, but substantially parallel planes P2 and P3. The handle 122 operates in another plane P1. It is contemplated that another handle can be positioned on the opposite end of tube 128 allowing movable access to both dual locking systems 100, 100A from either side of chaff pan 70. The handle 122, 222 can also be assumed to operate in a plane proximate to plane P2, which is what can be surmised from FIGS. 3-10.

The invention discussed from another descriptive perspective is that the grain cleaning system 26 receives grain and residual crop material from the threshing system 24 in the agricultural harvester 10, the grain cleaning system 26 includes a set of sieves 46, 48, 50 for further separation of the grain from the residual crop material that comes from the threshing system 24. The set of sieves 46, 48, 50 include the chaff pan 70 with a pivotal axis A1 near an end of the chaff pan 70. The chaff pan 70 has the chaff pan dual locking system 100, 200 coupled to the chaff pan 70 for the holding of the chaff pan 70 in two different positions when the chaff pan 70 is pivoted about pivotal axis A1. The chaff pan dual locking system 100, 200 has a first over-center locking arrangement 102, 202 and a second over-center locking arrangement 104, 204. The first over-center locking arrangement 102, 202 is used to hold the chaff pan 70 in an upward engaged position when the first over-center locking arrangement 102, 202 is locked. The first over-center locking arrangement 102, 202 includes a first linkage element 110, 210; and a second linkage element 108, 208. The second over-center locking arrangement 104, 204 holds the chaff pan 70 in a locked downward disengaged position when the second over-center locking arrangement 104, 204 is locked. The second over-center locking arrangement 104, 204 includes a first linkage element 110, 210; and a second linkage element 112, 74. The first linkage element 110, 210 of the first over-center locking arrangement 102, 202 is also the first linkage element 110, 210 of the second over-center locking arrangement 104, 204.

The first handle 122 is coupled to the first over-center locking arrangement 102, 202 and the second over-center locking arrangement 104, 204. The first handle 122 engages and disengages the first over-center locking arrangement 102, 202 as well as the second over-center locking arrangement 104, 204. The second handle 124 is utilized to pivot the chaff pan 70 between the first over-center locking arrangement 102, 202 and the second over-center locking arrangement 104, 204.

The chaff pan dual locking system 100, 200 includes a handle 222 that is rigidly coupled with the first linkage element 210. The handle 222 engages and disengages both the first over-center locking arrangement 102, 202 and the second over-center locking arrangement 104, 204. The handle 222 is not rigidly coupled to the chaff pan 70.

The first over-center locking arrangement 102, 202 and the second over-center locking arrangement 104, 204 move proximate to a common plane P2, as could be assumed from FIGS. 3-10. The handle 222 also operates proximate to the common plane P2. Alternatively, the handle 122, 222 can operated in a plane P1, which is offset from and is not proximate to the common plane P2, the handle 122, 222 moving in another plane P1 parallel with the common plane P2.

The chaff pan dual locking system 100, 200 is the first chaff pan dual locking system 100, 200 and is positioned to one side of a longitudinal center LC of the chaff pan 70. The grain cleaning system 26 further includes a second chaff pan dual locking system 100A, 200 substantially similar to the first chaff pan dual locking system 100, 200, the second chaff pan dual locking system 100A, 200 being positioned on another side of the longitudinal center LC of the chaff pan 70. The second chaff pan dual locking system 100A operating in a plane P3, with the planes P1, P2 and P3 all being co-planar or substantially so.

The grain cleaning system 26 further includes a handle 122, 222 that is rigidly coupled with the first linkage element 110, 210 of both the first chaff pan dual locking system 100, 200 and the second chaff pan dual locking system 100, 200.

The grain cleaning system 26 further includes at least one other handle 124 and/or 126 rigidly coupled to the chaff pan 70.

The handle 122, 222 engages and disengages both the first over-center locking arrangement 102, 202 and the second over-center locking arrangement 104, 204 of both the first chaff pan dual locking system 100, 200 and the second chaff pan dual locking system 100A, 200.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A grain cleaning system for receiving grain and residual crop material from a threshing system in an agricultural harvester, the grain cleaning system comprising:
   a set of sieves for separation of the grain from the residual crop material that comes from the threshing system; and
   a chaff pan receiving some of the residual crop material from the set of sieves, the chaff pan having a pivotal axis near an end of the chaff pan,
   wherein the chaff pan further has at least one chaff pan dual locking system coupled to the chaff pan for holding the chaff pan in two different positions when the chaff pan is pivoted about the pivotal axis relative to the grain cleaning system,
   wherein the chaff pan dual locking system has:
      a first over-center locking arrangement to hold the chaff pan in an upward engaged position when the first over-center locking arrangement is locked, the first over-center locking arrangement having:
         a first linkage element pivotally coupled to the chaff pan;
         a second linkage element pivotally coupled to the first linkage element; and
         a third linkage element non-pivotally constrained about the pivotal axis, the second linkage element being pivotally coupled to the third linkage element; and
      a second over-center locking arrangement to hold the chaff pan in a downward disengaged position when the second over-center locking arrangement is locked, the second over-center locking arrangement having:
         a first linkage element pivotally coupled to the chaff pan; and
         a second linkage element pivotally coupled to the first linkage element, the first linkage element of the first over-center locking arrangement being the first linkage element of the second over-center locking arrangement.

2. The grain cleaning system of claim 1, further comprising:
- a first handle coupled to the first over-center locking arrangement and the second over-center locking arrangement; and
- a second handle coupled to the chaff pan, the first handle engaging and disengaging the first over-center locking arrangement and engaging and disengaging the second over-center locking arrangement, the second handle being utilized to pivot the chaff pan between the first over-center locking arrangement and the second over-center locking arrangement.

3. The grain cleaning system of claim 2, wherein the second handle is rigidly coupled to the chaff pan, and the first handle is pivotally coupled to the chaff pan.

4. The grain cleaning system of claim 1, wherein the chaff pan dual locking system includes a handle that is rigidly coupled with the first linkage element.

5. The grain cleaning system of claim 4, wherein the handle engages and disengages both the first over-center locking arrangement and the second over-center locking arrangement.

6. The grain cleaning system of claim 5, wherein the handle is not rigidly coupled to the chaff pan.

7. The grain cleaning system of claim 4, wherein the first over-center locking arrangement and the second over-center locking arrangement move proximate to a common plane.

8. The grain cleaning system of claim 7, wherein the handle also operates proximate to the common plane.

9. The grain cleaning system of claim 7, wherein the handle is offset from and is not proximate to the common plane, the handle moving in another plane parallel with the common plane.

10. The grain cleaning system of claim 1, wherein the chaff pan dual locking system is the first chaff pan dual locking system and is positioned to one side of a longitudinal center of the chaff pan.

11. The grain cleaning system of claim 10, further comprising a second chaff pan dual locking system substantially similar to the first chaff pan dual locking system, the second chaff pan dual locking system being positioned on another side of the longitudinal center of the chaff pan.

12. The grain cleaning system of claim 11, further comprising a handle that is rigidly coupled with the first linkage element of both the first chaff pan dual locking system and the second chaff pan dual locking system.

13. The grain cleaning system of claim 12, further comprising at least one other handle rigidly coupled to the chaff pan.

14. The grain cleaning system of claim 12, wherein the handle engages and disengages both the first over-center locking arrangement and the second over-center locking arrangement of both the first chaff pan dual locking system and the second chaff pan dual locking system.

15. The grain cleaning system of claim 1, wherein the agricultural harvester comprises an agricultural combine.

* * * * *